United States Patent [19]

Dangschat

[11] Patent Number: 4,667,096
[45] Date of Patent: May 19, 1987

[54] POSITION MEASURING SYSTEM COMPRISING AT LEAST TWO SCANNING UNITS

[75] Inventor: Holmer Dangschat, Traunreut, Fed. Rep. of Germany

[73] Assignee: Johannes Heidenhain GmbH, Traunreut, Fed. Rep. of Germany

[21] Appl. No.: 716,395

[22] Filed: Mar. 27, 1985

[30] Foreign Application Priority Data

Mar. 31, 1984 [DE] Fed. Rep. of Germany ....... 3412063

[51] Int. Cl.$^4$ .................... G01B 21/00; G01B 21/22
[52] U.S. Cl. ..................... 250/231 SE; 340/347 P; 356/395; 250/237 G
[58] Field of Search .................. 250/231 SE, 237 G; 356/395; 340/347 P; 33/125 C; 324/175

[56] References Cited

U.S. PATENT DOCUMENTS 3,702,471 11/1972 Kennedy et al. ................. 340/347 P
4,449,191 5/1984 Mehnert ..................... 250/231 SE

FOREIGN PATENT DOCUMENTS 1673887 1/1968 Fed. Rep. of Germany.
1964381 10/1978 Fed. Rep. of Germany.

Primary Examiner—David C. Nelms
Assistant Examiner—Charles Wieland

Attorney, Agent, or Firm—Willian Brinks Olds Hofer Gilson & Lione Ltd.

[57] ABSTRACT

A position measuring system for measuring the relative position of two objects movable with respect to one another includes a housing which rotatably supports a shaft connected with the first object. A first graduation disk with a first incremental graduation and at least one absolutely positioned first reference mark is mounted to rotate with the shaft. A first scanning unit for the scanning of the first incremental graduation and the first reference mark is rotatably mounted on the shaft to rotate relative to the first graduation disk and the housing. A second graduation disk is firmly connected to the first scanning unit. The second graduation disk defines a second incremental graduation and at least one absolutely positioned second reference mark. A second scanning unit is fixedly mounted to the housing which is connected to the second object. In order to reproduce a reference position after an interrupted measurement operation and unknown movement of the relative position of the two objects, the first scanning unit is rotatable together with the second graduation disk for the scanning of the first reference mark of the first graduation disk and for the scanning of the second reference mark of the second graduation disk. The distance between the two reference marks is counted in a differential counter.

10 Claims, 3 Drawing Figures

POSITION MEASURING SYSTEM COMPRISING AT LEAST TWO SCANNING UNITS

BACKGROUND OF THE INVENTION

This invention relates to position measuring systems for measuring the relative position of first and second objects, of the type comprising a first graduation provided with at least one first reference mark and mounted to a first graduation carrier, means for connecting the first graduation carrier to the first object, and a first scanning unit mounted to scan the first graduation.

In order to determine a reference position in such position measuring systems, it is a common practice to drive the machine parts or measuring system components which are movable relative to one another from a starting position to a reference position defined by a reference mark. Once the reference mark is scanned, a measuring value indicative of the distance traveled up to the reference mark is stored, or alternately a predetermined measuring value is stored at the reference mark for the reference position. Such a calibrating process is possible with an incremental length or angle measuring system such as that described in West German patent DE-PS No. 19 64 381. This calibration process requires that the objects to be measured be movable relative to one another in an unimpeded fashion. This is because the components of the measuring system are firmly joined with the objects to be measured, and therefore the objects to be measured must be adjusted in position along with the associated components of the measuring system as the associated components of the measuring system are brought to the reference position defined by the reference mark.

West German DE-OS No. 16 73 887 describes a measuring system for a machine, which permits the determination of a reference position in the case of a machine slidepiece and machine bed which are firmly clamped in position. First the slidepiece must be driven into the position that is later to be taken as the reference position, for example with a measuring value equal to zero. The slidepiece is then clamped fast to the machine bed. Thereafter, the scanning plate of the measuring system is moved relative to the scale until a reference mark is scanned. On scanning the reference mark, the electronic counter of the measuring system is set to the value Zero. The machine slidepiece can then be released from the machine bed and the slidepiece moved to the desired position. The position of the reference mark therefore defines the reference position for further working operations.

Calibration processes for determining a reference position defined as a starting position, which occurs before the commencement of working operations proper, are not suitable for use with incremental measuring systems if working operations have already begun. For example, a working process in progress may be interrupted and it may then be necessary to reacquire the reference position. Such an interruption of a working operation in progress, for example in a manipulating automatic unit (generally designated as an industrial robot) can occur for example in the event of a power failure. The robot then remains standing at its momentary position at the time of the power failure and the measuring value referred to its original reference position is lost because of the power failure. This is because the power failure typically interrupts the measuring operation. In order to allow the interrupted working process to continue, the reference position must be regained. As a general rule, it is not always possible to move the robot out of its momentary position back to the original starting position, because for example a tool may be in engagement with a workpiece.

SUMMARY OF THE INVENTION

The present invention is directed to an improved measuring system which overcomes the disadvantages discussed above and which makes it possible, after a loss of position information, to reproduce a reference position without movement of the objects to be measured.

According to this invention, a position measuring system of the type described initially above is provided with a second graduation carrier firmly connected to the first scanning unit. A second graduation is disposed on the second graduation carrier, and this second graduation includes at least one second reference mark. A second scanning unit is provided for scanning the second graduation and this second scanning unit is mounted to the second object. The first scanning unit and the second graduation carrier are mounted together as a unit for movement with respect to the first graduation carrier and the second scanning unit in order to allow scanning of one of the first reference marks by the first scanning unit and one of the second reference marks by the second scanning unit without relative movement between the first and second objects. Finally, means are provided for registering a measuring value corresponding to the distance between the scanned ones of the first and second reference marks in order to reproduce the reference position after an interruption in operation of the scanning units and movement of one of the first and second objects to an arbitrary unknown relative position. In alternate embodiments the first graduation and first scanning unit may be interposed, or the second graduation and second scanning unit may be interposed. Further advantageous features of this invention are set forth in the dependent claims.

This invention provides important advantages, particularly in that it allows a reference position to be regained in a remarkably simple and rapid manner after measurement has been interrupted. In the preferred embodiment of this invention the reference position can be regained even though the first and second objects are in unknown momentary positions, and even though it is not possible to move either of the first and second objects. For example, in the event one of the two objects to be measured is a tool and both the measuring process and the processing operation are interrupted by a disturbance such as a power failure, the tool can remain in engagement on the workpiece while the reference position is regained. Thus, after the disturbance has been removed and the reference position has been redetermined, the interrupted processing operation can immediately be continued again. A withdrawal of the tool from the point of engagement on the workpiece and an accurate return of the tool to this engagement place is time consuming and difficult and can lead to damage to the workpiece. Furthermore, for example in the case of industrial robots, program-controlled rechecks of the particular reference position are possible between individual working cycles. In this way, the operating security of such systems can be considerably improved.

The invention itself, together with further objects and attendant advantages, will best be understood by reference to the following detailed description, taken in conjunction with accompanying drawings.

DETAILED DESCRIPTION OF THE PRESENTLY PREFERRED EMBODIMENTS

Figure 1:
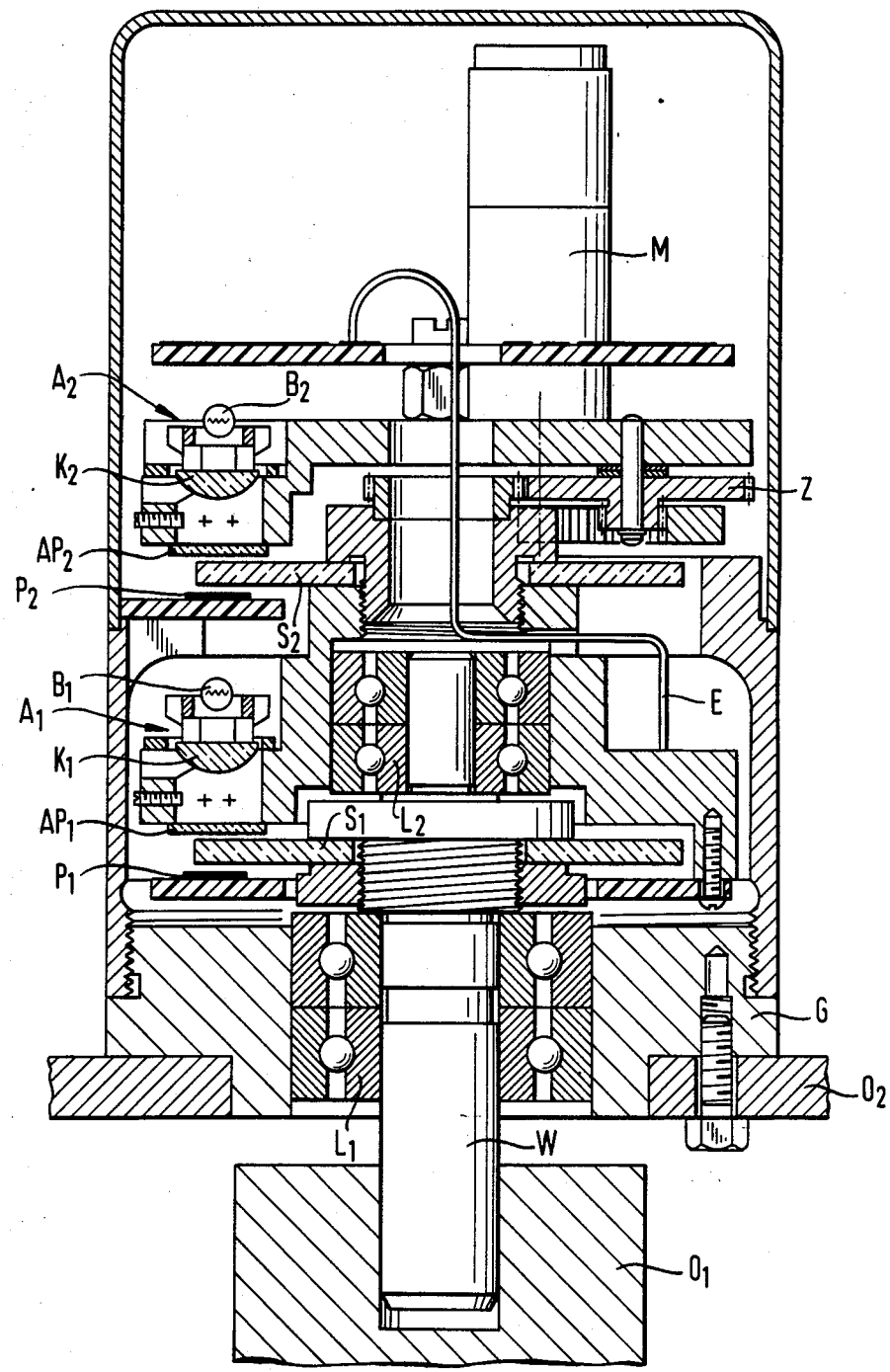
FIG. 1 is a longitudinal sectional view of an angle measuring system which incorporates a presently preferred embodiment of this invention.
Figure 2:
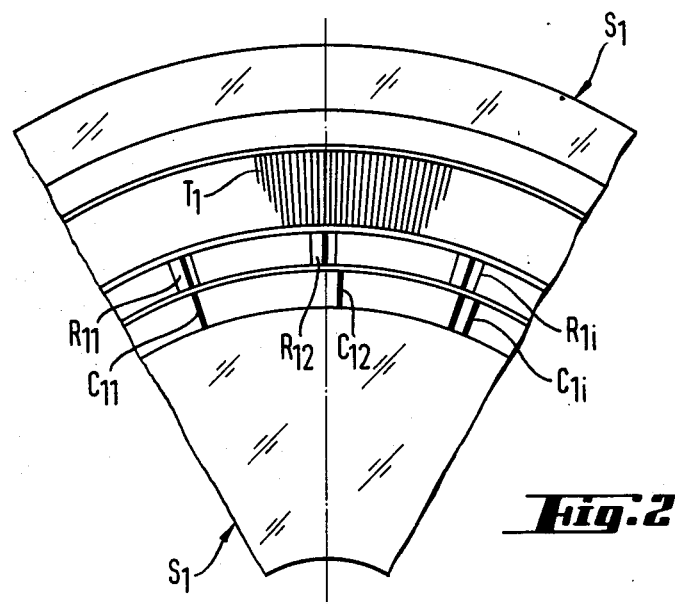
FIG. 2 is a partial plan view of a first graduation disk included in the embodiment of FIG. 1.

Turning now to the drawings, FIG. 1 shows a longitudinal sectional view of an incremental angle measuring system. This measuring system includes a housing G which is securely fastened to a second object $O_2$, the position of which is to be measured. For example, the second object $O_2$ can take the form of a machine bed of a processing machine (not shown). A shaft W is rotatably mounted in the interior of the housing G by means of bearings $L_1$. A first graduation disk $S_1$ is mounted to the shaft W. This first graduation disk $S_1$ carries a first incremental graduation $T_1$ and a set of first reference marks $R_{1i}$ ($i=1, 2, \ldots, n$). The first reference marks $R_{1i}$ are absolutely positioned with respect to the first incremental graduation $T_1$. Each of the first reference marks $R_{1i}$ is associated with a respective first code mark $C_{1i}$, as shown in FIG. 2. Each of the first code marks $C_{1i}$ stores in coded form the absolute position of the associated one of the first reference marks $R_{1i}$. The first incremental graduation $T_1$, the first reference marks $R_{1i}$, and the associated first code marks $C_{1i}$ are photoelectrically scanned by a first scanning unit $A_1$. This first scanning unit $A_1$ includes a first illuminating unit $B_1$, a first condenser $K_1$, a first scanning plate $AP_1$, as well as a set of first photosensors $P_1$.

The first incremental graduation $T_1$ takes the form of a radial grid of alternating photopermeable and photoimpermeable strips that follow upon one another in alternation. A first graduation scanning field of the first scanning plate $AP_1$ is mounted to scan the first incremental graduation $T_1$. The graduation of the first graduation scanning field is identical with the first incremental graduation $T_1$. Each of the first reference $R_{1i}$ is made up of an identical line group. Each of the identical line groups defines a predetermined irregular line distribution. A first reference mark scanning field with an identical irregular line distribution is included in the first scanning plate $AP_1$ to scan the first reference marks $R_{1i}$. The absolute positions of the first reference marks $R_{1i}$ with respect to the graduation zero point of the first incremental graduation $T_1$ are encoded by the associated first code marks $C_{1i}$. For example, each of the first code marks $C_{1i}$ can include a so-called bar code which stores the absolute position of the respective first reference mark $R_{1i}$. A first code mark scanning field is included on the first scanning plate $AP_1$ to scan the first code marks $C_{1i}$. In each case a respective first photodetector $P_1$ is included to scan each of the first incremental graduation $T_1$, the first reference marks $R_{1i}$, and the first code marks $C_{1i}$.

The shaft W extends out of the housing G and is connected with a first object $O_1$ to be measured. In this example, this first object $O_1$ takes the form of a spindle of a machine slidepiece of the processing machine. In the interior of the housing G, the shaft W serves to rotatably support the first scanning unit $A_1$ by means of a bearing $L_2$. Thus, the first scanning unit $A_1$ is mounted for rotation relative to both the housing G and the first graduation disk $S_1$.

During the measuring process proper, rotation of the shaft W causes the first graduation disk $S_1$ to rotate with respect to the first scanning unit $A_1$. The first scanning unit $A_1$ is locally fixed with respect to the housing G. Thus, the first incremental graduation $T_1$ rotates relative to the associated first graduation scanning field on the stationary first scanning plate $AP_1$. Light flux emanating from the first illuminating unit $B_1$ is modulated by the graduations moving relative to one another of the first incremental graduation $T_1$ and the first graduation scanning field. This modulated light flux falls upon the associated first photodetector $P_1$ which generates a periodic analog signal which is transformed in an evaluating unit (not shown) of the angle measuring system into pulses. These pulses are applied via a first input to a difference counter of the evaluating unit which operates to count the pulses. The count maintained by this difference counter can be displayed in a display unit engaged on the outlet side as a digital position measuring value. Alternately, the count maintained by this counter may be fed directly to a numerical control arrangement of the processing machine. In order to allow the turning direction of the first graduation disk $S_1$ to be determined, the first graduation scanning field of the first scanning plate $AP_1$ includes two graduations which are offset with respect to one another by a quarter of the graduation period of the first incremental graduation $T_1$.

Figure 3:
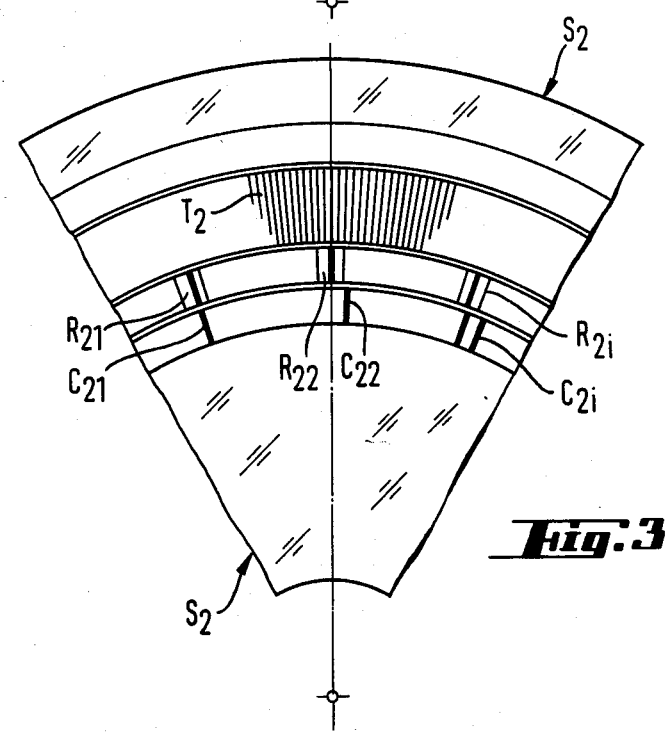
FIG. 3 is a partial plan view of a second graduation disk included in the embodiment of FIG. 1.

A second graduation disk $S_2$ is rigidly coupled to the first scanning unit $A_1$ and is also rotatably mounted on the shaft W. The second graduation disk $S_2$ defines a second incremental graduation $T_2$ and a set of second reference marks $R_{2i}$ ($i=1, 2, \ldots, n$). Each of the second reference marks $R_{2i}$ is absolutely positioned with respect to the second incremental graduation $T_2$. In addition, a set of second code marks $C_{2i}$ is provided, one associated with each of the second reference marks $R_{2i}$ (FIG. 3). The second incremental graduation $T_2$, the second reference marks $R_{2i}$, and the associated second code marks $C_{2i}$ are photoelectrically scanned by a second scanning unit $A_2$ which is fixedly mounted within the housing G. This second scanning unit $A_2$ includes a second illuminating unit $B_2$, a second condenser $K_2$, a second scanning plate $AP_2$, as well as a set of second photodetectors $P_2$.

The second incremental graduation $T_2$, the second reference marks $R_{2i}$, and the second code marks $C_{2i}$ of the second graduating disk $S_2$ are identical with the first incremental graduation $T_1$, the first reference marks $R_{1i}$, and the first code marks $C_{1i}$ of the first graduation disk $S_1$, respectively. The second scanning plate $AP_2$ defines a second graduation scanning field for the second incremental graduation $T_2$, a second reference mark scanning field for the second reference marks $R_{2i}$, and a second code mark scanning field for the second code marks $C_{2i}$. The scanning fields of the second scanning plate $AP_2$ are identical with the corresponding scanning fields of the first scanning plate $AP_1$. To the second incremental graduation $T_2$, the second reference marks $R_{2i}$, and the second code marks $C_{2i}$, as well as to the associated scanning fields, there is allocated in each case a respective second photodetector $P_2$. In order to allow the turning direction of the second graduation disk $S_2$ to be determined, the second graduation scanning field defines two graduations on the second scanning plate $AP_2$ which are offset with respect to one another by a quarter of the graduation period of the second incremental graduation $T_2$.

In an incremental measuring system, it is of great importance at the beginning of a measurement operation to determine a reference position that serves as the starting position for the measurements and which can be reproduced again in the event of a malfunction. For the following discussion it will be assumed that either before the beginning of a measurement operation or after a malfunction (such as a power failure) which causes the position measuring value of the incremental position measuring system to be lost, the two objects $O_1$, $O_2$ to be measured are at a standstill with respect to one another. The first graduation disk $S_1$ is therefore in a fixed position with respect to the housing G, but the position of the graduation zero point relative to the housing G is not known. In order to determine or regain this reference position the momentary position of the first graduation disk $S_1$ with respect to the housing G must be determined. For this purpose in a known manner (and therefore not designated in detail here) the difference counter in the evaluating unit is set on the value of zero or on some other numerical value. Simultaneously, the measuring system is switched to the calibrating mode of operation. Then the first scanning unit $A_1$ is set in rotation by a motor M mounted within the housing G. The motor M drives the first scanning unit $A_1$ via a reversing gear Z. In this example, it will be assumed that first a second reference mark $R_{2i}$ of the second graduation disk $S_2$ is scanned by the corresponding second reference mark scanning field of the locally fixed second scanning plate $AP_2$. The second graduation disk $S_2$ turns synchronously with the first scanning unit $A_1$. When the second reference mark is scanned, the associated second photodetector $P_2$ of the locally fixed second scanning unit $A_2$ generates a signal that starts the difference counter in the evaluating unit when in the calibration mode of operation. From this point in time onward, the periodic analog signal generated by the associated second photodetector $P_2$ in the scanning of the second incremental graduation $T_2$ of the rotating second graduation disk $S_2$ by means of the second graduation scanning field on the fixed second scanning plate $AP_2$ is evaluated and the corresponding counting pulses are applied via a second input to the difference counter. Once the counter has been started and graduation increments of the second incremental graduation $T_2$ are being counted at some point an adjacent first reference mark $R_{1i}$ on the stationary first graduation disk $S_1$ will be scanned by the associated first scanning mark scanning field on the rotating first scanning plate $AP_1$. When this occurs, the associated first photodetector $P_1$ of the first scanning unit $A_1$ generates a signal which causes the graduation increments of the first incremental graduation $T_1$ of the first graduation disk $S_1$ to be counted, in difference with the graduation increments of the second graduation disk $S_2$. This simultaneous counting in difference of the graduation increments of the first incremental graduation $T_1$ and the second incremental graduation $T_2$ by the difference counter causes the count maintained by the difference counter to remain constant. This is because the difference between the two counting sequences is zero. Simultaneously, the first code mark scanning field on the first scanning plate $AP_1$ has read the absolute position value of the first reference mark $R_{1i}$ from the code mark $C_{1i}$ associated with the scanned first reference mark $R_{1i}$. In the scanning of the second reference mark $R_{2i}$ simultaneously the absolute position value of the second reference mark $R_{2i}$ is read from the associated second code mark $C_{2i}$ by the associated second code mark scanning field on the second scanning plate $AP_2$. These two absolute position values of the first reference mark $R_{1i}$ and the second reference mark $R_{2i}$ are applied to the evaluating unit. The absolute position value of the first reference mark $R_{1i}$ and the absolute position value of the second reference mark $R_{2i}$ are superposed with the correct algebraic sign (plus or minus), along with the counting value stored in the difference counter that corresponds to the difference between the two reference marks $R_{1i}$, $R_{2i}$. When these three numbers are summed with the correct algebraic sign, the evaluating unit determines the absolute position value that the first graduation disk $S_1$ momentarily occupies with respect to the housing G. At this point, the motor M is stopped and the calibrating process is completed.

The measuring system then reverts to the measurement mode of operation, in which the difference counter is used to count measuring pulses generated in the rotation of the first graduation disk $S_1$ with respect to the housing G. The first incremental graduation $T_1$ is scanned by means of the first graduation scanning field of the stationary first scanning plate $AP_1$ and the associated first photodetector $P_1$. Counting pulses generated in response to this photodetector $P_1$ are applied to the first input of the difference counter. In the event of a disturbance such as a power failure, the reference position for the first graduation disk $S_1$ can be regained by means of the calibration process described above, even if the first graduation disk $S_1$ cannot be moved out of a momentary position, because for example a tool connected with the shaft W by the spindle of the processing machine happens to be in engagement with a workpiece to be processed when the disturbance arises.

In the foregoing description of the calibration process it was assumed that the shaft W and the first graduation disk $S_1$ are at a standstill with respect to the housing G. This however is not a necessary condition.

Similarly, in the measuring process itself, it is not necessary that the first scanning unit $A_1$ and the second graduation disk $S_2$ be held at a standstill with respect to the housing G. Relative rotation of the first scanning unit $A_1$ and therewith of the second graduation disk $S_2$ with respect to the housing G has no influence on the measuring process proper, since in this relative rotation counting pulses recovered in the scanning of the second incremental graduation $T_2$ of the second graduation disk $S_2$ are applied to the second input of the difference counter, while the counting pulses obtained in the scanning of first incremental graduation $T_1$ of the first graduation disk $S_1$ for the measurement proper are fed to the first input of the difference counter. The difference counter counts inputs on the first and second inputs in difference, and therefore the counting values recovered in this relative movement of the first scanning unit $A_1$ are additively or subtractively superposed on the counting values of the measurement proper, according to the turning direction of the first scanning unit $A_1$. For this reason, the rest position of the first scanning unit $A_1$ and of the second graduation disk $S_2$ with respect to the housing G during the measuring process proper is arbitrary. A mechanical stop in the housing G for the first scanning unit $A_1$ is therefore not required, since it is not necessary to reposition the scanning unit $A_1$ in a reproducible manner after the calibration process. Of course, such a stop is subject to wear, and the elimination of such a stop brings with it measurement advantages.

In a particularly simple embodiment of this invention the first graduation disk $S_1$ is provided with only one first reference mark $R_1$ and the second graduation disk $S_2$ is provided with only one second reference mark $R_2$. Each of the two reference marks $R_1$, $R_2$ defines the graduation zero point of the respective incremental graduation $T_1$, $T_2$. For this reason, no code marks are required to identify the absolute positions of the reference marks $R_1$, $R_2$, and the production of the graduation disks $S_1$, $S_2$ can be correspondingly simplified.

During the calibration process the counting value determined in the difference counter for the distance between the first reference mark $R_1$ and the second reference mark $R_2$ directly represents in this case the absolute position value, which the first graduation disk $S_1$ occupies momentarily with respect to the housing G.

The reversible rotation of the first scanning unit $A_1$ occurs for the calibration or reproduction process, because the electric lines E connected with the first illuminating unit $B_1$ and the first photodetectors $P_1$ are movable over a rotation range that is somewhat greater than a full circle, and namely alternates in both turning directions. This reversible operation makes possible for example program-controlled rechecks of the respective reference position between individual working cycles.

In a manner not shown, current can be supplied to the first illuminating unit $B_1$ and the signals of the first photodetectors $P_1$ can be transmitted through slip rings instead of through the electric lines E. In this case, the first scanning unit $A_1$ together with the first graduation disk $S_2$ can be turned without a reversing gear Z in only one turning direction through arbitrarily many revolutions.

In the embodiment shown, the second graduation disc $S_2$ is firmly joined to the first scanning unit $A_1$, while the first graduation disc $S_1$ and the second scanning unit $A_2$ are mounted to the first and second objects $O_1$, $O_2$, respectively. In a first alternate embodiment, the first and second scanning units $A_1$, $A_2$ are mounted to the first and second objects $O_1$, $O_2$, respectively, and the first and second graduation discs $S_1$, $S_2$ are mounted to rotate as a unit with respect to the first and second objects. This first alternate embodiment is similar to that of FIG. 1, with the first graduation disc $S_1$ and the first scanning unit $A_1$ interchanged. If desired, the first and second graduation discs $S_1$, $S_2$ can be integrated into a single graduation carrier.

In a second alternate embodiment, the first and second graduation discs $S_1$, $S_2$ are mounted to the first and second objects $O_1$, $O_2$, respectively, and the first and second scanning units $A_1$, $A_2$ are mounted to rotate as a unit with respect to the first and second objects. This second alternate embodiment is similar to that of FIG. 1, with the second graduation disc $S_2$ and the second scanning unit $A_2$ interchanged. In each case, two spaced scanning units are used to provide complete flexibility in terms of the locations of the scanning regions of the scanning units.

Of course, it should be understood that a wide range of changes and modifications can be made to the preferred embodiment described above. For example, this invention is usable both in angle measuring systems and in length measuring systems. In addition, this invention is not limited to use with photoelectric measuring systems, but can for example also be used in connection with magnetic, inductive, and capacitive measuring systems. It is therefore intended that the foregoing detailed description be regarded as illustrative rather than limiting, and that it be understood that it is the following claims, including all equivalents, which are intended to define the scope of this invention.

I claim:

1. In a position measuring system for measuring the relative positions of first and second objects, of the type comprising a first graduation provided with at least one first reference mark, and mounted on a first graduation carrier, means for connecting the first graduation carrier to the first object, and a first scanning unit mounted to scan the first graduation, the improvement comprising:
   a second graduation carrier firmly connected to the first scanning unit;
   a second graduation disposed on the second graduation carrier, said second graduation comprising at least one second reference mark;
   a second scanning unit for scanning the second graduation;
   first means for mounting the second scanning unit to the second object;
   second means for mounting the first scanning unit and the second graduation carrier for movement together as a unit with respect to the first graduation carrier and the second scanning unit to allow scanning of one of the first reference marks by the first scanning unit and scanning of one of the second reference marks by the second scanning unit, said second means operative to allow said scanning to be performed independently of movement of the first and second objects relative to one another; and
   means for registering a measuring value corresponding to the distance between said ones of the first and second reference marks in order to reproduce a reference position after an interruption in operation of the scanning units and movement of one of the first and second objects to an arbitrary unknown position with respect to the other of the first and second objects.

2. The invention of claim 1 wherein the first and second graduation carriers are disc shaped, wherein the first mounting means mounts the second graduation carrier for rotation concentric with the first graduation carrier, and wherein the first mounting means comprises a drive mechanism for rotating the first scanning unit and the second graduation carrier.

3. The invention of claim 1 wherein said at least one first reference mark comprises a plurality of first reference marks, each of which is associated with a respective first code mark indicative of an absolute position of the associated first reference mark, and wherein said at least one second reference mark comprises a plurality of second reference marks, each of which is associated with a respective second code mark indicative of an absolute position of the associated second reference mark.

4. The invention of claim 3 wherein each of the reference marks comprises a respective line group, and wherein all of the line groups define the same irregular line distribution.

5. The invention of claim 2 wherein the drive mechanism comprises a motor and a reversing gear driven by the motor.

6. A position measuring system for measuring the relative position of first and second objects, said system comprising:

a first measuring component mounted to the first object;

a second measuring component adapted to cooperate with the first measuring component to measure the relative position between the first and second measuring components;

a third measuring component mounted to move as a unit with the second measuring component;

a fourth measuring component mounted to the second object and adapted to cooperate with the third measuring component to measure the relative position between the third and fourth measuring components;

one of the first and second measuring components comprising a first graduation with at least one first reference mark, and the other of the first and second measuring components comprising a first scanning unit positioned to scan the first graduation and the first reference mark;

one of the third and fourth measuring components comprising a second graduation with at least one second reference mark, and the other of the third and fourth measuring components comprising a second scanning unit positioned to scan the second graduation and the second reference mark;

means for mounting the second and third measuring components together to move as a unit with respect to the first and fourth measuring components to allow scanning of one of the first reference marks by the first scanning unit and one of the second reference marks by the second scanning unit without relative movement between the first and second objects; and means for registering a measuring value corresponding to the distance between said ones of the first and second reference marks in order to reproduce a reference position after an interruption in operation of the scanning units and movement of one of the first and second objects to an arbitrary unknown position with respect to the other of the first and second objects.

7. The invention of claim 6 wherein the first and second graduations are arcuate and concentrically mounted, and wherein the mounting means comprises a drive mechanism for rotating the second and third measurement components.

8. The invention of claim 6 wherein said at least one first reference mark comprises a plurality of first reference marks, each of which is associated with a respective first code mark indicative of an absolute position of the associated first reference mark, and wherein said at least one second reference mark comprises a plurality of second reference marks, each of which is associated with a respective second code mark indicative of an absolute position of the associated second reference mark.

9. The invention of claim 8 wherein each of the reference marks comprises a respective line group, and wherein all of the line groups define the same irregular line distribution.

10. The invention of claim 7 wherein the drive mechanism comprises a motor and a reversing gear driven by the motor.

* * * * *